United States Patent
Matsumoto et al.

(10) Patent No.: US 10,212,696 B2
(45) Date of Patent: Feb. 19, 2019

(54) MOBILE COMMUNICATION SYSTEM AND USER TERMINAL

(71) Applicant: KYOCERA CORPORATION, Kyoto (JP)

(72) Inventors: Naohisa Matsumoto, Kawasaki (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/223,573

(22) Filed: Jul. 29, 2016

(65) Prior Publication Data

US 2016/0338035 A1 Nov. 17, 2016

Related U.S. Application Data

(63) Continuation of application No. PCT/JP2015/052414, filed on Jan. 28, 2015.

(Continued)

(51) Int. Cl.
*H04W 72/04* (2009.01)
*H04W 76/14* (2018.01)
*H04W 8/00* (2009.01)

(52) U.S. Cl.
CPC ..... *H04W 72/0406* (2013.01); *H04W 72/044* (2013.01); *H04W 72/0446* (2013.01); *H04W 76/14* (2018.02); *H04W 8/005* (2013.01)

(58) Field of Classification Search
None
See application file for complete search history.

(56) References Cited

U.S. PATENT DOCUMENTS

| | | | |
|---|---|---|---|
| 2014/0086152 A1* | 3/2014 | Bontu | H04L 1/1812 370/329 |
| 2015/0016410 A1* | 1/2015 | Lee | H04L 1/18 370/330 |

(Continued)

FOREIGN PATENT DOCUMENTS

| | | |
|---|---|---|
| JP | 2010-177851 A | 8/2010 |
| WO | 2006/016330 A1 | 2/2006 |

(Continued)

OTHER PUBLICATIONS

LG Electronics, R1-135481, Discussion on Resource Allocation in D2D Communications, 3GPP TSG RAN WG1 Meeting #75, San Francisco, USA, Nov. 11-15, 2013, whole document.*

(Continued)

*Primary Examiner* — Hanh N Nguyen
*Assistant Examiner* — Jose L Perez
(74) *Attorney, Agent, or Firm* — Studebaker & Brackett PC

(57) ABSTRACT

A first user terminal supporting D2D (Device-to-Device) communication comprises a processor and a memory coupled to the processor. The processor is configured to perform processes of: receiving, D2D resource information from a base station, determining data radio resources and control radio resources on the basis of the D2D resource information, from among D2D radio resources available for the D2D communication, transmitting, D2D communication control information by using the determined control radio resources to a second user terminal, the D2D communication control information indicating locations of the determined data radio resources, and transmitting and retransmitting, D2D communication data by using the determined data radio resources to the second user terminal.

3 Claims, 18 Drawing Sheets

Related U.S. Application Data

(60) Provisional application No. 61/934,336, filed on Jan. 31, 2014.

(56) References Cited

U.S. PATENT DOCUMENTS

| | | |
|---|---|---|
| 2015/0103789 A1 | 4/2015 | Tanaka |
| 2015/0110038 A1* | 4/2015 | Yang .................. H04W 72/042 370/329 |
| 2015/0208453 A1 | 7/2015 | Yamazaki et al. |
| 2015/0215977 A1 | 7/2015 | Yamazaki |
| 2015/0245342 A1 | 8/2015 | Morita |
| 2016/0227518 A1* | 8/2016 | Li ...................... H04W 72/042 |
| 2016/0330780 A1* | 11/2016 | Kim .................... H04W 48/16 |

FOREIGN PATENT DOCUMENTS

| | | | |
|---|---|---|---|
| WO | 2013/085273 A1 | 6/2013 | |
| WO | 2013/179472 A1 | 12/2013 | |
| WO | 2013/183732 A1 | 12/2013 | |
| WO | 2014/017476 A1 | 1/2014 | |
| WO | 2014/017498 A1 | 1/2014 | |

OTHER PUBLICATIONS

Samsung, R1-135221, Resource allocation for D2D broadcast communication, 3GPP TSG RAN WG1 Meeting #75, San Francisco, USA, Nov. 11-15, 2013, whole document.*

Ericsson, Synchronization Signals and Channel Design for D2D Discovery and Communication (R1-135804), Nov. 11, 2013, 3GPP TSG RAN WG1 Meeting #75, whole document (Year: 2013).*

Ericsson, Synchronization Signals and Channel Design for D2D Discovery and Communication (R1-135804), Nov. 11, 2013, 3GPP TSG RAN WG1 Meeting #75, whole document (Year: 2013) (Year: 2013).*

International Search Report issued in PCT/JP2015/052414; dated Mar. 31, 2015.

Written Opinion issued in PCT/JP2015/052414; dated Mar. 31, 2015.

3rd Generation Partnership Project; Technical Specification Group RAN; Study on LTE Device to Device Proximity Services-Radio Aspects; 3GPP TR 36.843 V1.0.0; Nov. 2013; pp. 1-32; Release 12; 3GPP Organizational Partners.

Ericsson; Synchronization Signals and Channel Design for D2D Discovery and Communication; 3GPP TSG RAN WG1 Meeting #75; R1-135804; Nov. 11-15, 2013; pp. 1-4; San Francisco, USA.

An Office Action; "Notice of Reasons for Rejection," issued by the Japanese Patent Office dated Sep. 13, 2016, which corresponds to Japanese Patent Application No. 2015-559991 and is related to U.S. Appl. No. 15/223,573; with English language statement of relevance.

NEC; "Considerations of subframe design for D2D and cellular resource multiplexing"; 3GPP TSG RAN WG1 Meeting #76; R1-140490; Feb. 10-14, 2014; pp. 1-4; Prague, Czech Republic.

Ericsson; "D2D Scheduling Procedure"; 3GPP TSG-RAN WG2 #84; Tdoc R2-134238; Nov. 11-15, 2013; 7pp.; San Francisco, USA.

The extended European search report issued by the European Patent Office dated Aug. 18, 2017, which corresponds to European Patent Application No. 15744019.9-1857 and is related to U.S. Appl. No. 15/223,573.

Intel Corporation, "Discussion on D2D Resource Allocation Method", 3GPP TSG RAN WG1 Meeting #75, R1-135115, Nov. 11-15, 2013, 5 pages, San Francisco, USA.

* cited by examiner

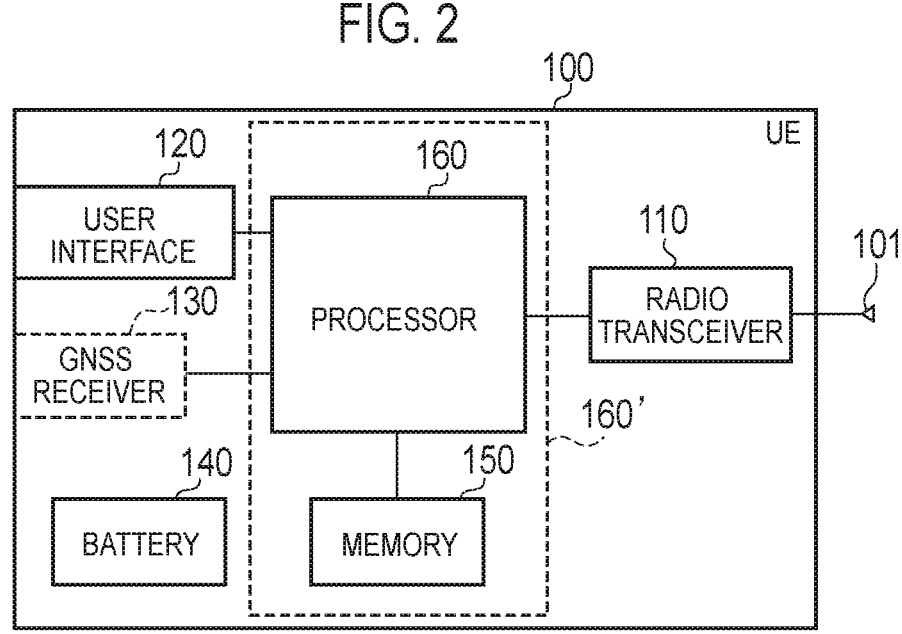
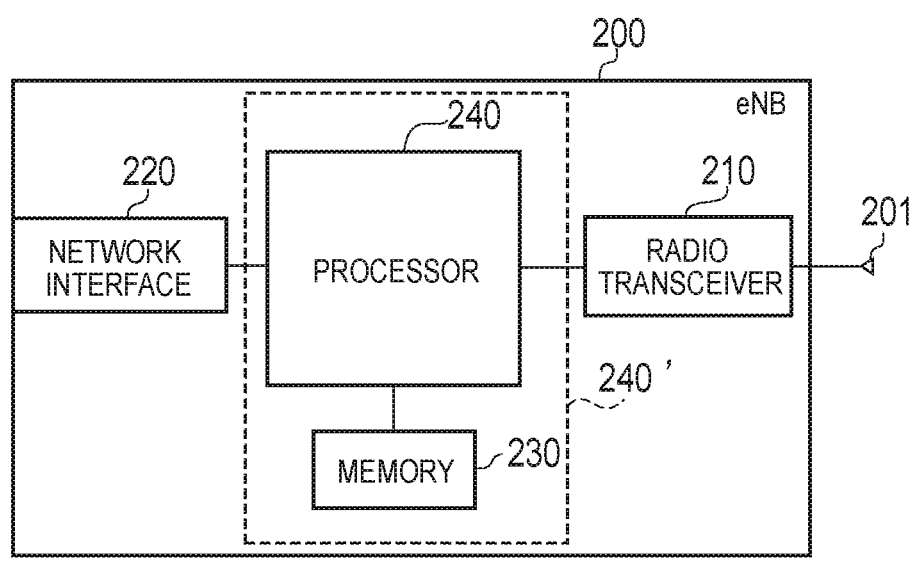

MOBILE COMMUNICATION SYSTEM AND USER TERMINAL

RELATED APPLICATIONS

This application is a continuation application of international application PCT/JP2015/052414, filed Jan. 28, 2015, which claims benefit of U.S. Provisional Patent Application No. 61/934,336 (filed on Jan. 31, 2014), the entirety of both applications hereby expressly incorporated by reference.

TECHNICAL FIELD

The present invention relates to a mobile communication system and a user terminal that supports D2D proximity service.

BACKGROUND ART

In 3GPP (3rd Generation Partnership Project) which is a project aiming to standardize a mobile communication system, the introduction of a Device to Device (D2D) proximity service is discussed as a new function in Release 12 and later (see Non Patent Literature 1).

The D2D proximity service (D2D ProSe) is a service enabling direct communication without passing through a network within a synchronization cluster including a plurality of synchronized user terminals. The D2D proximity service includes a discovery process (Discovery) in which a proximal terminal is discovered and a communication process (Communication) in which direct communication is performed.

CITATION LIST

Non Patent Literature

[NPL 1] 3GPP technical report "TR 36.843 V1.0.0" Jan. 16, 2014

SUMMARY

A first user terminal according to a first aspect supports D2D (Device-to-Device) communication. The first user terminal comprises a processor and a memory coupled to the processor. The processor is configured to perform processes of: receiving, D2D resource information from a base station, determining data radio resources and control radio resources on the basis of the D2D resource information, from among D2D radio resources available for the D2D communication, transmitting, D2D communication control information by using the determined control radio resources to a second user terminal, the D2D communication control information indicating locations of the determined data radio resources, and transmitting and retransmitting, D2D communication data by using the determined data radio resources to the second user terminal.

A mobile communication method according to a second aspect is used in a first user terminal supporting D2D (Device-to-Device) communication. The mobile communication method comprises steps of: receiving, D2D resource information from a base station, determining data radio resources and control radio resources on the basis of the D2D resource information, from among D2D radio resources available for the D2D communication, transmitting, D2D communication control information by using the determined control radio resources to a second user terminal, the D2D communication control information indicating locations of the determined data radio resources, and transmitting and retransmitting, D2D communication data by using the determined data radio resources to the second user terminal.

An apparatus according to a third aspect is an apparatus to be provided in a first user terminal supporting D2D (Device-to-Device) communication. The apparatus comprises a processor and a memory coupled to the processor. The processor is configured to perform processes of: receiving, D2D resource information from a base station, determining data radio resources and control radio resources on the basis of the D2D resource information, from among D2D radio resources available for the D2D communication, transmitting, D2D communication control information by using the determined control radio resources to a second user terminal, the D2D communication control information indicating locations of the determined data radio resources, and transmitting and retransmitting, D2D communication data by using the determined data radio resources to the second user terminal.

BRIEF DESCRIPTION OF DRAWINGS

FIG. 2 is a block diagram of a UE.

FIG. 3 is a block diagram of an eNB.

DESCRIPTION OF EMBODIMENTS

Overview of Embodiment

Figure 1:
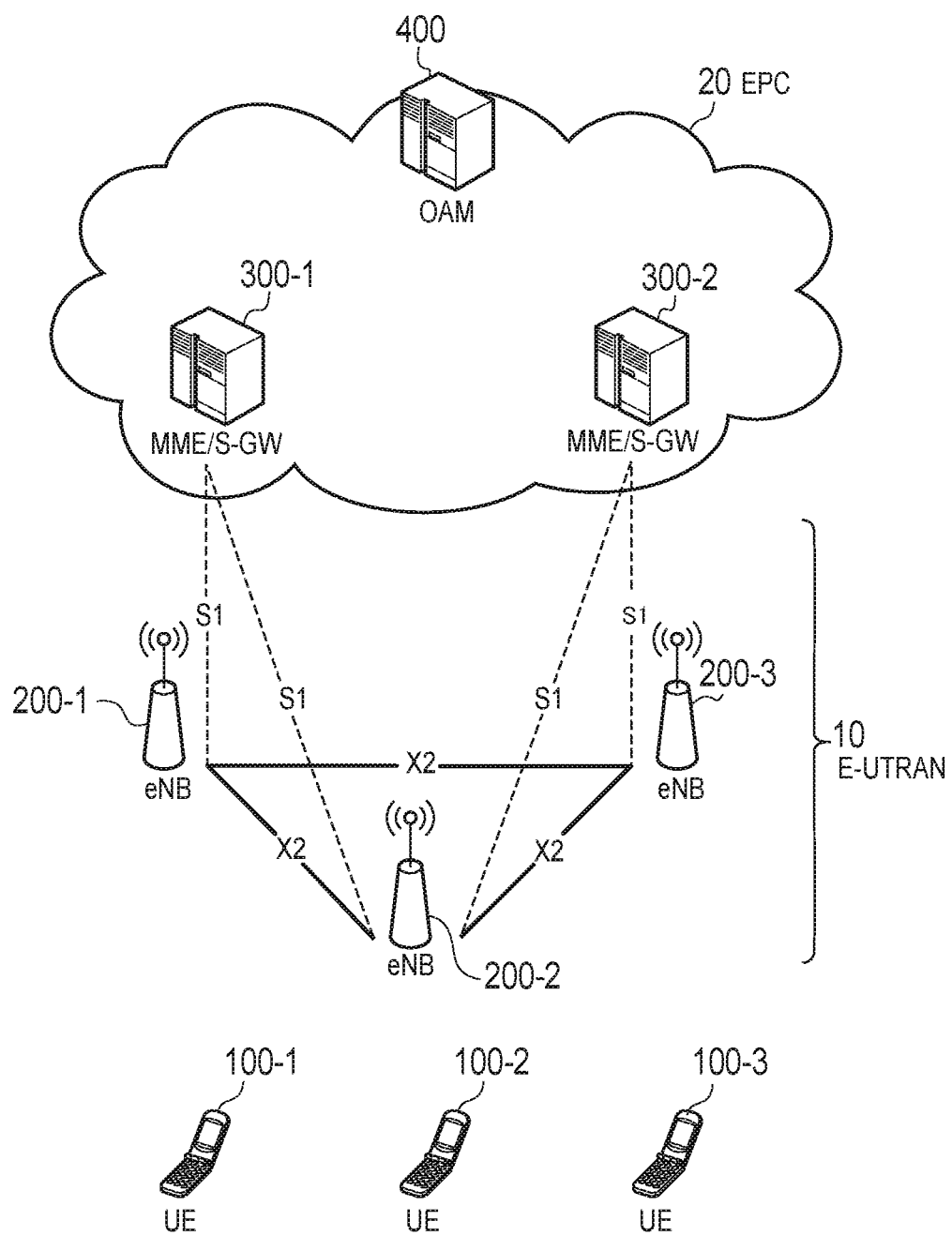
FIG. 1 is a configuration diagram of an LTE system.

A mobile communication system according to embodiments is a mobile communication system that supports a D2D proximity service in which direct communication not passing through a network is enabled, comprising a user terminal configured to decide data resources that is time-frequency resources used for transmitting D2D communication data, and control resources that is time-frequency resources used for transmitting control information indicating locations of the data resources, from among time-frequency resources available for the D2D proximity service, wherein the user terminal is further configured to decide the data resources from a data resource domain limited in range in the time-frequency resources available for the D2D proximity service.

The mobile communication system according to embodiments comprises a base station configured to transmit, to the user terminal, data resource information for specifying the data resource domain, the data resources, or a candidate of the data resource domain.

In the embodiments, the data resource information is information for specifying the data resources, and the base station is further configured to transmit the data resource information by using downlink control information.

In the embodiments, the data resource information is information for specifying a range of the data resources, and the base station transmits the data resource information by using an RRC message.

In the embodiments, the user terminal is further configured to decide the control resources from a control resources domain limited in range in the time-frequency resources available for the D2D proximity service, and the base station is further configured to transmit the data resource information by unicast, to the user terminal, together with control resources information specifying the control resources domain, the control resources, or a candidate of the control resources domain.

In the embodiments, the base station is further configured to transmit the data resource information by broadcast, and the data resource information includes information for limiting at least one of a location of the data resources and a size of the data resources.

In the embodiments, when the user terminal exists in a cell managed by the base station, the user terminal is further configured to transmit the data resource information received from the base station.

The mobile communication system according to the embodiments comprises another user terminal located out of coverage, the user terminal is further configured to transmit the data resource information to the another user terminal, when the user terminal receives, from the another user terminal, flag information indicating that the another user terminal is located out of coverage.

The mobile communication system according to the embodiments comprises another user terminal that previously stores setting information for limiting a range of the data resource domain and is located out of coverage, when the other user terminal receives the data resource information from the user terminal, the other user terminal prioritizes the data resource information over the setting information to decide the data resources.

In the embodiments, the user terminal is further configured to decide the data resources on the basis of a location of the control resources and/or a size of the control resources.

In the embodiments, a control resources domain that is a range in which the user terminal decides the control resources, is provided periodically in a time axis direction, a range of a control resource domain in a next period is limited depending on a location of control resources in a previous period and a range of the data resource domain is limited depending on the location of the control resources, and the user terminal is further configured to decide the data resources depending on the location of the control resources in the previous period.

In the embodiments, the user terminal is further configured to use the control resources to transmit, together with the control information, flag information indicating whether or not the user terminal is located out of coverage.

A mobile communication system according to the embodiments is a mobile communication system that supports a D2D proximity service in which direct communication not passing through a network is enabled, comprising a user terminal configured to decide data resources that is time-frequency resources used for transmitting D2D communication data, and control resources that is time-frequency resources used for transmitting control information indicating a location of the data resources, from among time-frequency resources available for the D2D proximity service, wherein the user terminal is further configured to use the decided data resources to repeatedly transmit the same D2D communication data at a bit level or in units of resource blocks.

A user terminal according to the embodiments is a user terminal used in a mobile communication system that supports a D2D proximity service in which direct communication not passing through a network is enabled, comprising a controller configured to decide data resources that is time-frequency resources used for transmitting D2D communication data, and control resources that is time-frequency resources used for transmitting control information indicating a location of the data resources, from among time-frequency resources available for the D2D proximity service, wherein the controller is further configured to decide the data resources from a data resource domain limited in range in the time-frequency resources available for the D2D proximity service.

Embodiments

An embodiment of applying the present invention to the LTE system will be described below.

(Configuration of System)

FIG. 1 is a configuration diagram of an LTE system according to the present embodiment.

As illustrated in FIG. 1, the LTE system includes a plurality of UEs (User Equipments) 100, E-UTRAN (Evolved-Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). Each eNB 200 corresponds to a base station. The eNB 200 manages a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes MME (Mobility Management Entity)/S-GWs (Serving-Gateways) 300, and OAM 400 (Operation and Maintenance). Further, the EPC 20 corresponds to a core network.

The MME is a network node that performs various mobility controls and the like, for the UE 100 and corresponds to a controller. The S-GW is a network node that performs control to transfer user data and corresponds to a mobile switching center.

The OAM 400 is a server device managed by an operator and performs maintenance and monitoring of the E-UTRAN 10.

Next, the configurations of the UE 100 and the eNB 200 will be described.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. In addition, the memory 230 is integrated with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
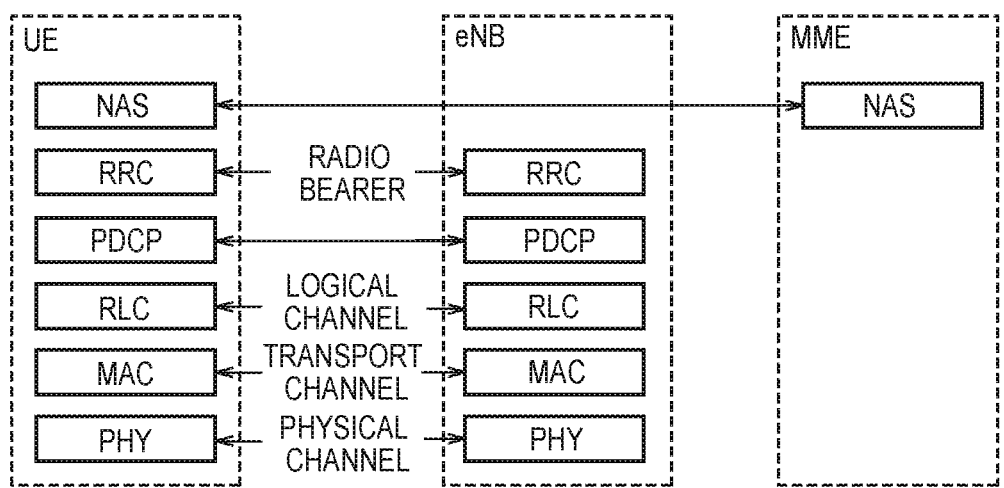
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs priority control of data, and a retransmission process and the like by hybrid ARQ (HARQ).

Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler to decide a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management and mobility management, for example.

Figure 5:
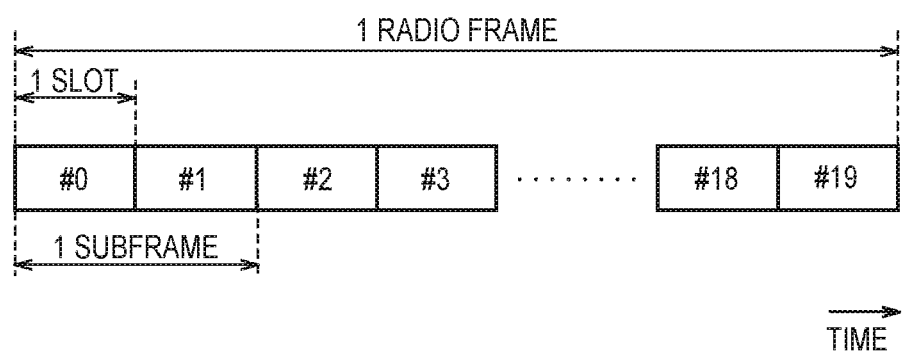
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region that can be mainly used as a physical uplink shared channel (PUSCH). Moreover, in each subframe, a demodulation reference signal (DMRS) and a sounding reference signal (SRS) are arranged.

(D2D Communication)

Next, description will be provided by comparing the D2D communication with the normal communication (the cellular communication) in the LTE system.

Figure 6:
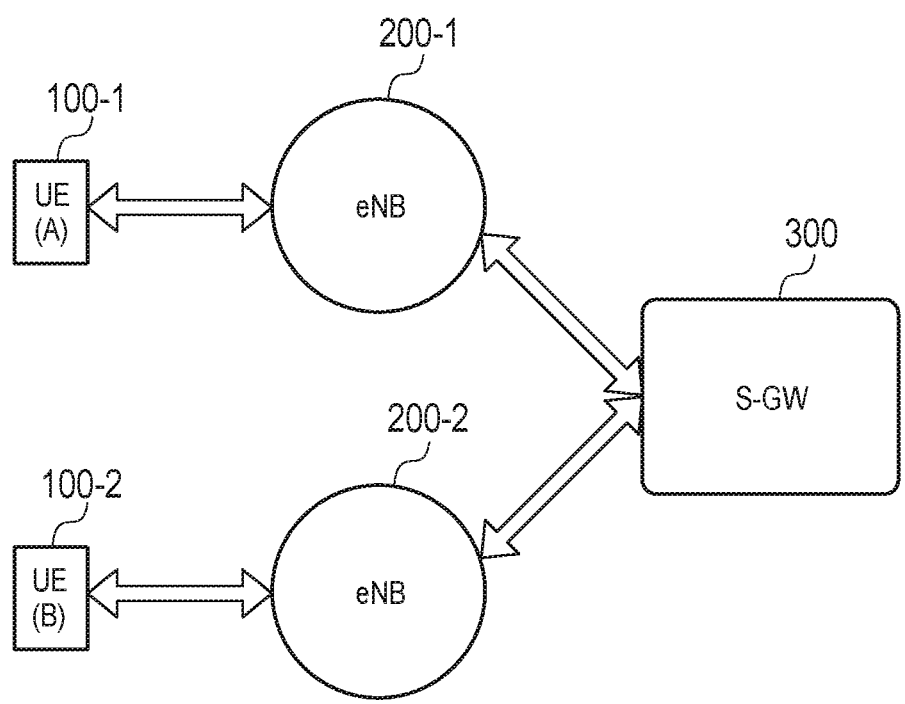
FIG. 6 is a diagram showing a data path in cellular communication.

FIG. 6 is a diagram illustrating a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
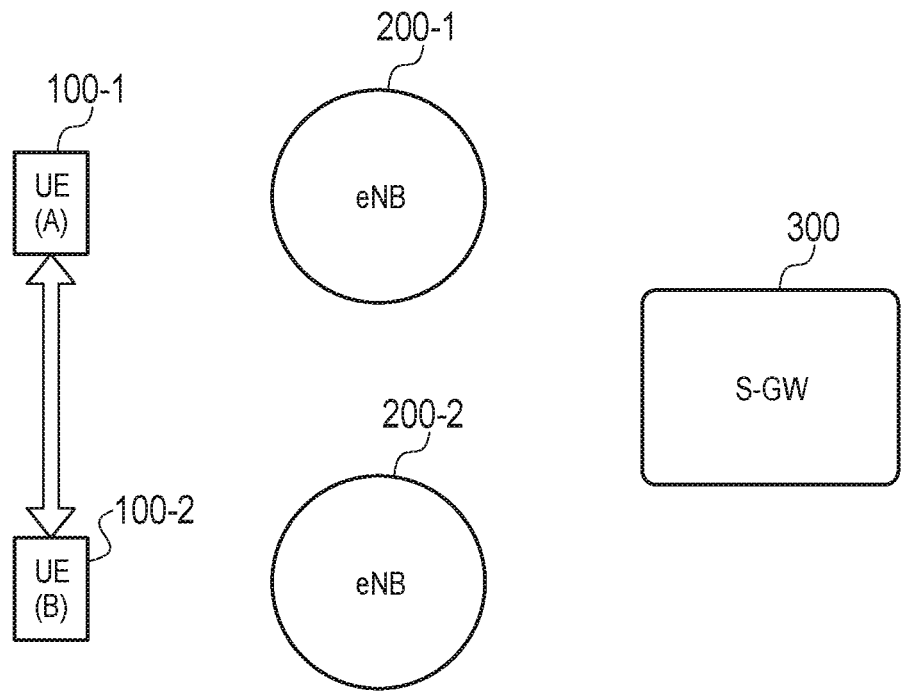
FIG. 7 is a diagram showing a data path in D2D communication.

FIG. 7 is a diagram illustrating a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced.

It is noted that cases in which the D2D communication is started include (a) a case in which the D2D communication is started after a proximal terminal is discovered by performing an operation for discovering a proximal terminal, and (b) a case in which the D2D communication is started without performing an operation for discovering a proximal terminal.

For example, in the above-described case (a), one UE 100 of the UE 100-1 and the UE 100-2 discovers the other UE 100 existing in the vicinity of the one UE 100, so that the D2D communication is started.

In such a case, in order to discover the proximal terminal, the UE 100 has a (Discover) function of discovering another UE 100 existing in the vicinity of the UE 100, and/or a (Discoverable) function of being discovered by another UE 100.

Specifically, the UE 100-1 transmits a discovery signal (Discovery signal/Discoverable signal) indicates a signal for discovering the proximal terminal or a signal that is used to be discovered from the proximal terminal. The UE 100-2 which received the discovery signal discovers the UE 100-1. When the UE 100-2 transmits a response to the discovery signal, the UE 100-1 that has transmitted the discovery signal discovers the UE 100-2, which is the proximal terminal.

It is noted that the UE 100 need not necessarily perform the D2D communication even upon discovering a proximal terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. Additionally, the UE 100-1 may report the discovery of the proximal UE 100 (that is, the UE 100-2) to an upper layer (e.g. application, etc.), if the UE 100-1 did not perform the D2D communication after discovering the proximal terminal. For example, the application executes the process (e.g. process of plotting the location of the UE 100-2 to the map information) based on the report.

Furthermore, the UE 100 may report the eNB 200 that the proximal terminal has been discovered and may receive an instruction from the eNB 200 indicate the commutation with the proximal terminal is performed in cellular communication or in the D2D communication.

On the other hand, in the above-described case (b), for example, the UE 100-1 starts the transmission (such as a notification through broadcasting) of a signal for the D2D communication without specifying a proximal terminal. Thus, the UE 100 is capable of starting the D2D communication regardless of the existence of the discovery of a proximal terminal. It is noted that the UE 100-2 that is performing the standby operation for the signal for the D2D communication performs synchronization or/and demodulation on the basis of the signal from the UE 100-1.

(Decision of Control Resources and Data Resources)

Next, an operation, in which the UE 100-1 decides control resources and data resources, will be described.

The UE 100-1 decides data resources, which are time-frequency resources used for transmitting D2D communication data, from among time-frequency resources available for a D2D proximity service. Furthermore, the UE 100-1 decides control resources (SA resources), which are time-frequency resources used for transmitting control information (SA: Scheduling Assignment) indicating a location of the data resources, from among the time-frequency resources available for the D2D proximity service.

In the present embodiment, the UE 100-1 decides the SA resources from a control resource domain (SA resource domains) limited in range in the time-frequency resources available for the D2D proximity service. The SA resource domain is an area in which SA resources used by the UE 100 to transmit SA are arranged. Furthermore, the UE 100-1 decides data resources from a data resource domain limited in range in the time-frequency resources available for the D2D proximity service. The data resource domain is an area in which data resources used by the UE 100 to transmit the D2D communication data are arranged.

The UE 100-1 transmits SA indicating a location of the decided data resources by using the decided SA resources. The presence of the SA allows the UE 100-2 that receives the SA to grasp the locations of the data resources used by the UE 100-1 to transmit the D2D communication data. The UE 100-2 scans the grasped data resources to thereby receive the D2D communication data from the UE 100-1.

Next, an operation example when the UE 100-1 (UE 100) decides the data resources will be described with reference to FIG. 8 to FIG. 13.

Figure 8:
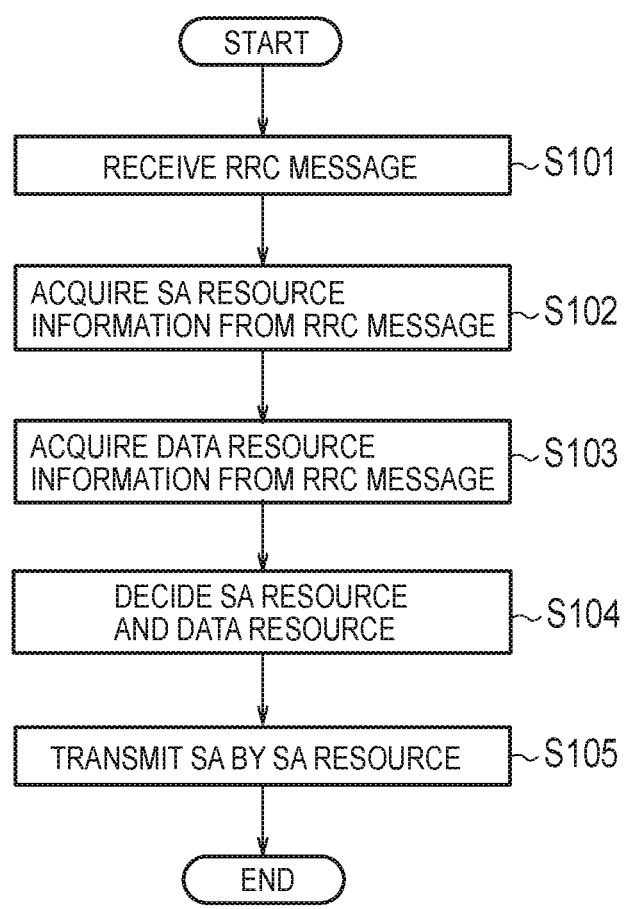
FIG. 8 is a flowchart for describing an operation of a UE 100 according to an operation example 1.
Figure 9:
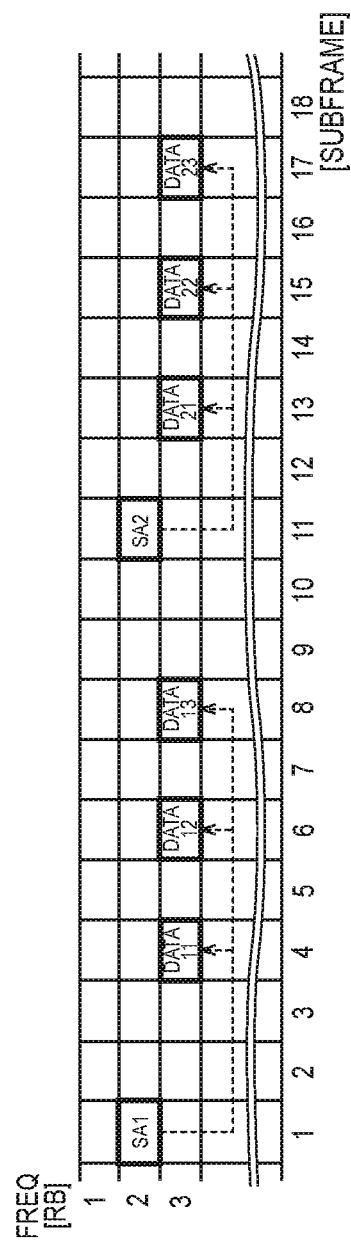
FIG. 9 is a configuration diagram of a radio frame for describing the operation example 1.
Figure 10:
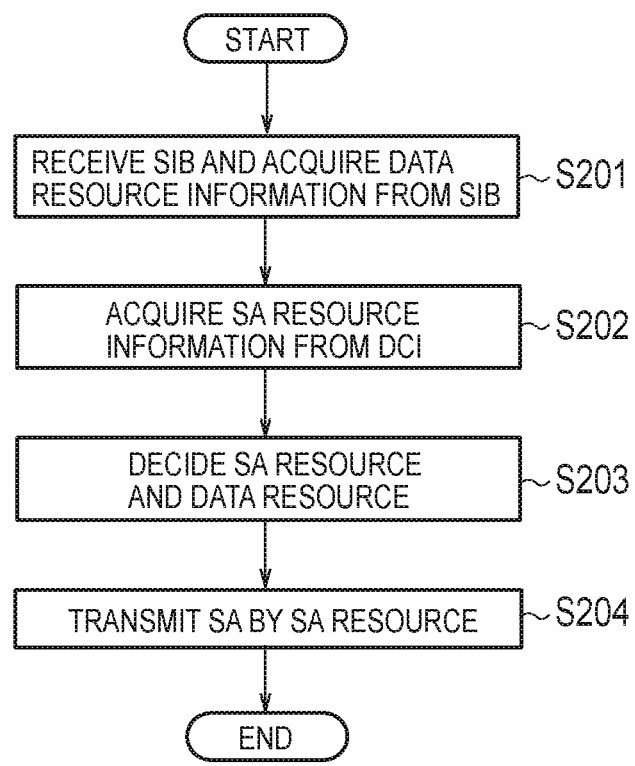
FIG. 10 is a flowchart for describing an operation of the UE 100 according to a modification of the operation example 1.
Figure 11:
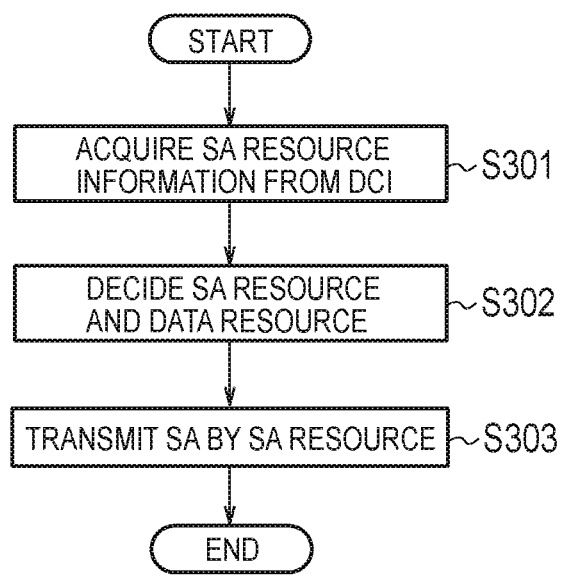
FIG. 11 is a flowchart for describing an operation of the UE 100 according to an operation example 2.
Figure 12:
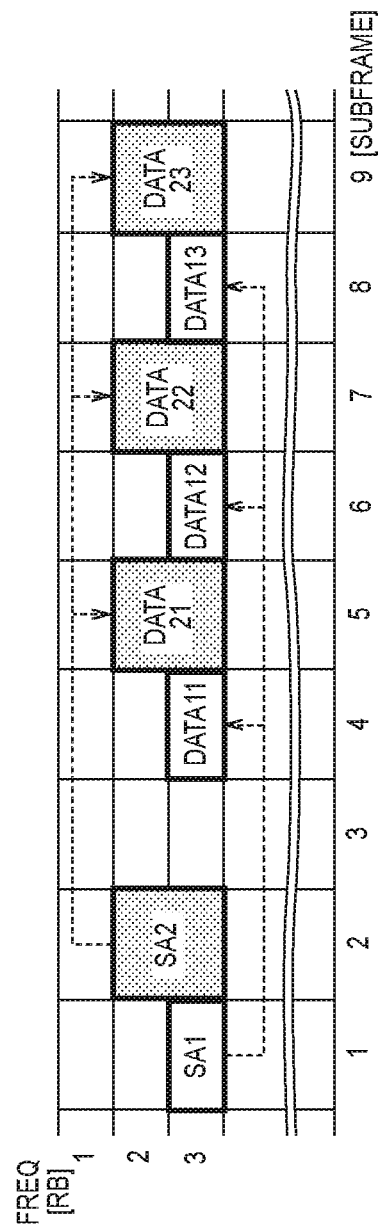
FIG. 12 is a configuration diagram of a radio frame for describing the operation example 2.
Figure 13:
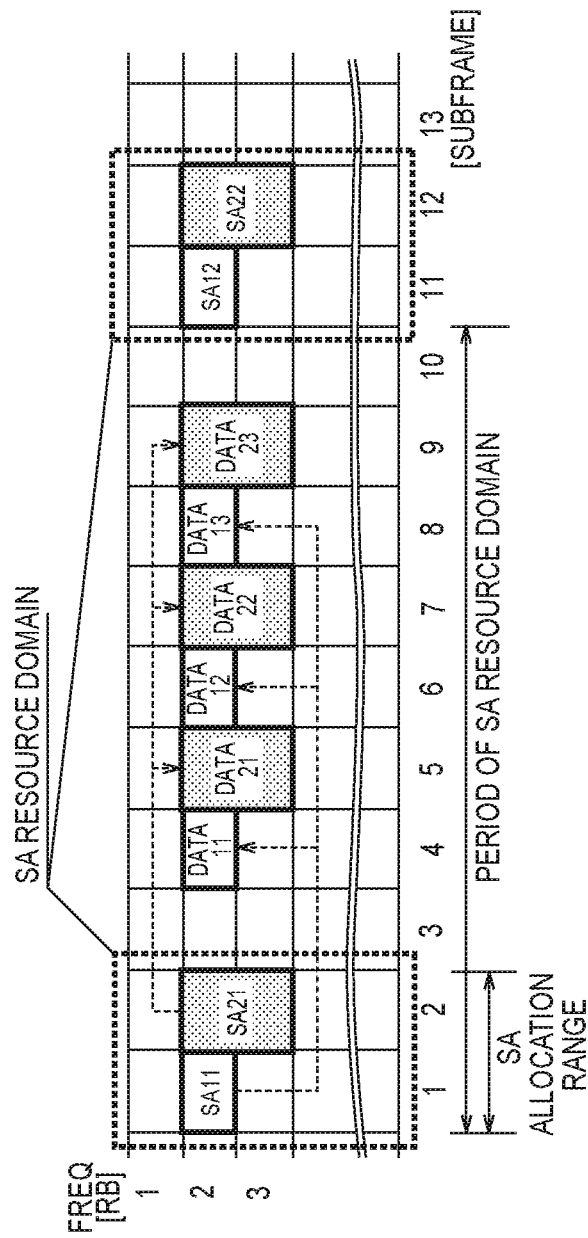
FIG. 13 is a configuration diagram of a radio frame for describing a modification of the operation example 2.

FIG. 8 is a flowchart for describing an operation of the UE 100 according to an operation example 1. FIG. 9 is a configuration diagram of a radio frame for describing the operation example 1. FIG. 10 is a flowchart for describing an operation of the UE 100 according to a modification of the operation example 1. FIG. 11 is a flowchart for describing an operation of the UE 100 according to an operation example 2. FIG. 12 is a configuration diagram of a radio frame for describing the operation example 2. FIG. 13 is a configuration diagram of a radio frame for describing a modification of the operation example 2.

(A) Operation Example 1

The UE 100 exists in a cell managed by the eNB 200. The eNB 200 transmits, to the UE 100, data resource information which is information for limiting a range of the data resource domain. The eNB 200 is capable of transmitting the data resource information to the UE 100 by at least either one of an RRC message (for example, an SIB (System Information Block)) or DCI (Downlink Control Information). The UE 100 decides data resources on the basis of the data resource information received from the eNB 200.

The data resource information is information for specifying a data resource domain, data resources, or a candidate of the data resource domain. Furthermore, the data resource information may be information for limiting at least one of a location of the data resources and a size of the data resources.

For example, the data resource information includes information indicating at least any one of a frequency band and/or a time zone of the data resource domain, a period (time) of the data resource domain, an offset (time and/or frequency) from SA indicating a data resource start, and a data resource interval. The data resource information may include information indicating at least either one of a resource size of one data resource, the number of data resources, or a modulation and coding scheme (MCS) applied to the D2D communication data.

It is noted that, in the case of transmitting data resource information for (directly) specifying data resources, the eNB 200 is capable of transmitting the data resource information by using DCI. On the other hand, in the case of transmitting the data source information for (directly) specifying a range of the data resources (that is, a data resource domain), the eNB 200 is capable of transmitting the data resource information by using an RRC message (for example, an SIB).

In the operation example 1, a description will be provided for the case in which the eNB 200 transmits the data resource information, together with the control resource information (SA resource information) for limiting the range of the SA resource domain.

The SA resource information is information for specifying an SA resource domain, SA resources, or a candidate of the SA resource domain. For example, the SA resource information includes information indicating at least any one of a frequency band and/or a time zone of the SA resource domain, an offset (time and/or frequency), and a period (time).

The offset, for example, is expressed using the following equation.

$$(\text{offset}) = (SFN \times 10 + \text{subframe}) \bmod (\text{period})$$

Furthermore, the SA resource information may include information indicating at least any one of a size of one SA resource, the number of SA resources allocable by the UE 100 (and/or the presence or absence of the SA resources), and a modulation and coding scheme (MCS) applied to the SA.

It is noted that, in the case of stopping the UE 100 from transmitting SA, the eNB 200 may transmit, as the SA resource information, information indicating the absence of the SA resources to the UE 100 or transmit, as the SA resource information, information indicating that the number of SA resources is 0, to the UE 100.

As shown in FIG. 8, in step S101, the eNB 200 transmits by unicast, to the UE 100, the data resource information together with the SA resource information by an RRC message. The UE 100 receives the RRC message from the eNB 200.

In step S102, the UE 100 acquires the SA resource information from the RRC message. Furthermore, in step S103, the UE 100 acquires the data resource information from the RRC message.

In step S104, the UE 100 decides the SA resources and the data resources on the basis of the SA resource information and the data resource information. A description will be provided on the assumption that the SA resource information is an allocation rule for limiting the range of the SA resource domain, and the data resource information is an allocation rule for limiting the range of the data resource domain.

For example, as shown in FIG. 9, the SA resource information includes a size (=1 [RB]×1 [subframe]), an offset (=1 [subframe]), and a period (=10 [subframes]) of the SA resources. The data resource information includes a data resource domain (Fre=3), an offset (Subframe offset=3) from the SA indicating a data resource start, a size (=1 [RB]×1 [subframe]) of one data resource, the number (=3) of data resources, and a data interval (=2 [subframes]). The UE 100 decides the SA resources and the data resources from the SA resource domain and the data resource domains limited in range on the basis of these information.

In step S105, the UE 100 transmits SA 1 indicating the data resources of D2D communication data (DATA 11 to DATA 13) by using the SA resources, and transmits the DATA 11 to DATA 13 by using the data resources. Furthermore, the UE 100 transmits SA 2 indicating the data resources of D2D communication data (DATA 21 to DATA 23) by using the SA resources, and transmits DATA 21 to DATA 23.

(B) Modification of Operation Example 1

In the above-described operation example 1, the eNB 200 transmits the data resource information by unicast. In the present modification, the eNB 200 transmits the data resource information by broadcast.

As shown in FIG. 10, in step S201, the eNB 200 transmits the data resource information by an SIB. The UE 100 receives the SIB from the eNB 200 and acquires the data resource information from the SIB. Here, a description will be provided on the assumption that the data resource information is an allocation rule for limiting the range of the data resource domain.

In step S202, the eNB 200 transmits the SA resource information by DCI. The UE 100 acquires the SA resource information from the DCI. A description will be provided on the assumption that the SA resource information is information for specifying the SA resources.

In step S203, the UE 100 decides data resources to be used from among data resource candidates on the basis of the SA resource information and the data resource information. The UE 100 may decide data resources on the further basis of a data capacity of the D2D communication data.

For example, in FIG. 9, the eNB 200 transmits SA resource information for specifying an SA resource indicating a location of SA 1. The UE 100 decides, as the SA resource, the SA resource (resource at a location of SA 1), which is specified from the eNB 200. Furthermore, the UE 100 decides data resources (resources at locations of DATA 11 to DATA 13) on the basis of the SA resource, the allocation rule for limiting the range of the data resource domain, and the data capacity.

In step S204, the UE 100 transmits SA 1 indicating the data resources of the D2D communication data (DATA 11 to DATA 13) by using the SA resources, and transmits DATA 11 to DATA 13 by using the data resources.

Then, similarly to step S203, the UE 100 decides SA resources on the basis of the SA resource information (resource at a location of SA 2) received from the eNB 200. The UE 100 decides data resources (resources at locations of DATA 21 to DATA 23) on the basis of the SA resources, the allocation rule for limiting the range of the data resources, and the data capacity.

(C) Operation Example 2

Next, in the operation example 1, the UE 100 decides the data resources on the basis of the data resource information from the eNB 200. In an operation example 2, the UE 100 decides the data resources on the basis of setting information previously stored in the UE 100.

The setting information is at least one of information for limiting the range of the data resource domain and information for limiting the range of the SA resource domain. The setting information may be the allocation rule for limiting the range of the data resource domain (and/or the allocation rule for limiting the range of the SA resource domain). The setting information has a configuration similar to that of the above-described data resource information (and/or the SA resource information).

As shown in FIG. 11, in step S301, the UE 100-1 acquires the SA resource information from the DCI received from the eNB 200. A description will be provided on the assumption that the SA resource information indicates (subframe 1, RB 3: resource at a location of SA 1 in FIG. 12).

In step S302, the UE 100-1 decides the SA resources and the data resources on the basis of the SA resource information and the setting information.

Here, a description will be provided on the assumption that the setting information indicates an offset (Subframe offset=3) from the SA indicating a data resource start, a size (=the size of SA) of one data resource, the number (=3) of data resources indicated by the SA, and an interval (2 [subframes]) of the data resources.

According to the setting information, since the SA resource information is (subframe 1, RB 3), the range of the control resource domain available for the UE 100 is limited. The UE 100 decides, as the SA resource, a resource at a location of SA 1. Furthermore, on the basis of the SA resource and the setting information, the UE 100-1 decides data resources so that the location of the resource of DATA 1 is (subframe 4 (=1+3+2×0), RB 3), the location of the resource of DATA 2 is (subframe 6 (=1+3+2×1), RB 3), and the location of the resource of DATA 3 is (subframe 8 (=1+3+2×2), RB 3) (see FIG. 12). On the basis of the location of the SA resource and the size of the SA resource, the UE 100 decides the data resources from the data resource domain limited in range.

Step S303 Corresponds to Step S105.

On the other hand, a description will be provided on the assumption that the eNB 200 transmits, as the SA resource information, information indicating (subframe 2, RBs 2 and 3: resource at a location of SA 1 in FIG. 12) to the UE 100-2.

Since the SA resource information is (subframe 2, RBs 2 and 3), the UE 100-2 decides, as the SA resource, a resource at a location of SA 1. Furthermore, a description will be provided on the assumption that the UE 100-2 stores the same setting information as that of the UE 100-1. On the basis of the SA resources and the setting information, the UE 100-2 decides data resources so that the location of the resource of DATA 1 is (subframe 5 (=2+3+2×0), RBs 2 and 3), the location of the resource of DATA 2 is (subframe 7 (=2+3+2×1), RBs 2 and 3), and the location of the resource of DATA 3 is (subframe 9 (=2+3+2×2), RBs 2 and 3) (see FIG. 12).

It is noted that, in the operation example 2, on the basis of the setting information, the UE 100 decides the data resources; however, the UE 100 may decide the data resources on the basis of the data resource information from the eNB 200.

(D) Modification of Operation Example 2

In a modification of the operation example 2, as shown in FIG. 13, SA resource domains are provided periodically in a time axis direction in the time-frequency resources available for the D2D proximity service. Furthermore, in the modification of the operation example 2, the range of the SA resource domain in a next period is limited depending on the location of the SA resource in a previous period. For example, the SA resource information (or setting information) indicates an allocation rule in which locations of SA resources are provided at the same locations as those of SA resources in a previous period. Moreover, the data resource information (or setting information) indicates an allocation rule in which the range of the data resource domain is limited depending on the locations of the SA resources. For example, the data resource information (or setting information) is the same information as the setting information of the above-described operation example 1.

In this case, when the UE 100-1 decides the resource at the location of SA 11 (subframe 11, RB 2) as the SA resource, since the location of the SA resource in a next period is provided at the same location as that of SA 11, the UE 100 decides the resource at the location of SA 12 (subframe 11, RB 2) as the SA resource.

Furthermore, depending on the resource at the location of SA 12, the range of the data resource domain is limited. Therefore, the UE 100-1 decides data resource depending on the location of the SA resource (subframe 11, RB 2) in a previous period.

In this way, it is possible to avoid a collision of data resources as long as SA resources do not overlap between the UE 100-1 and another UE 100 (for example, the UE 100-2). Particularly, when the UE 100-2 scans the SA resource domain before deciding the SA resource and when the UE 100-1 periodically continues to transmit SAs, the UE 100-2 is capable of avoiding the use of SA 11 in use on the basis of the SA resource information. As a consequence, it is possible to avoid a collision between the SA of the UE 100-1 and the SA of the other UE 100.

(Operation of UE 100 in Coverage/Out of Coverage)

Next, an operation of the UE 100 located in coverage/out of coverage will be described with reference to FIG. 14 to FIG. 16.

Figure 14:
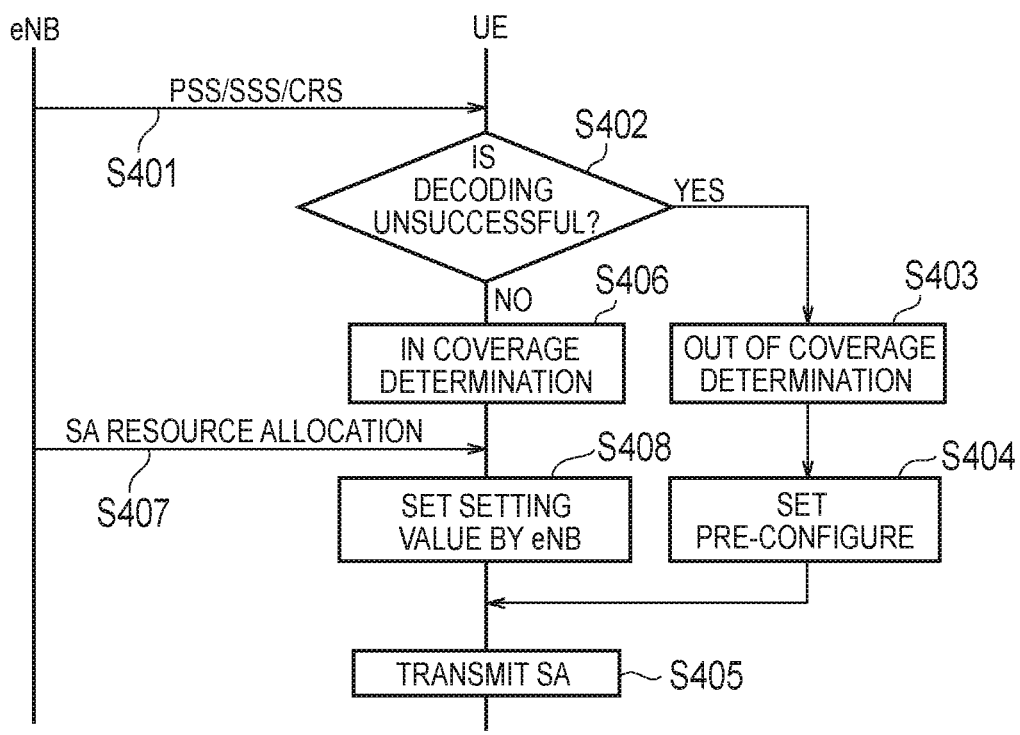
FIG. 14 is a sequence for describing an operation of a mobile communication system according to an embodiment.

FIG. 14 is a sequence for describing an operation of the mobile communication system according to the embodiment. FIG. 15 is a flowchart for describing an operation of the UE 100 located in coverage. FIG. 16 is a flowchart for describing an operation of the UE 100 located out of coverage.

(A) Switching of Resource Information and Setting Information from eNB 200

Depending on whether or not the UE 100 exists in a cell managed by the eNB 200, the UE 100 switches between the resource information and the setting information, and decides the SA resource and the data resource. Here, the resource information is at least any one of the SA resource information and the data resource information. Details will be described, below.

As shown in FIG. 14, in step S401, the eNB 200 broadcasts a predetermined radio signal. The predetermined radio signal is a synchronization signal (PSS: Primary Synchronization Signal/SSS: Secondary Synchronization Signal) or a cell reference signal (CRS: Cell Reference Signal), for example. The UE 100 receives the predetermined radio signal from the eNB 200.

In step S402, the UE 100 attempts decoding of the predetermined radio signal from the eNB 200. When the UE 100 fails to decode the radio signal (in the case of "Yes"), the process of step S403 is executed. On the other hand, when the UE 100 is successful in decoding the radio signal (in the case of "No"), the process of step S406 is executed.

In step S403, the UE 100 determines to be located out of coverage. It is noted that the UE 100 determines to be located out of coverage also when it is not possible to receive the radio signals from all eNBs 200 (that is, the reception level of the radio signals from all eNBs 200 is below a threshold value).

In step S404, in order to decide the SA resource and the data resource on the basis of the setting information, the UE 100 performs Pre-configure setting. In this way, when it is not possible to receive the resource information from the eNB 200, the UE 100 is capable of appropriately deciding the SA resource and the data resource. Thereafter, the UE 100 decides the SA resource and the data resource on the basis of the setting information (Pre-configure setting).

In step S405, the UE 100 uses the decided SA resource to transmit SA. The UE 100 may use the SA resource to transmit, together with the SA, flag information indicating whether or not the UE 100 is located out of coverage. For example, the flag information indicates "1" when the UE 100 is located in coverage (in the case of In Coverage), and indicates "0" when the UE 100 is located out of coverage (in the case of Out of Coverage). Here, since the UE 100 is located out of coverage, the flag information indicates locating out of coverage.

On the other hand, in step S406, the UE 100 determines that the UE 100 exists in a cell of the eNB 200 from which the predetermined radio signal is transmitted.

In step S407, the eNB 200 transmits resource information (specifically, the SA resource information) to the UE 100. The UE 100 receives the resource information.

In step S408, in order to decide the SA resource and the data resource on the basis of the resource information received from the eNB 200, the UE 100 sets a setting value indicated by the SA resource information received from the eNB 200. Thereafter, the UE 100 decides the SA resource and the data resource on the basis of the SA resource (setting value). Thereafter, the UE 100 performs the process of step S405.

It is noted that the UE 100 may transmit, together with the SA, the flag information indicating that the UE 100 is not located out of coverage.

(B) Operation of UE 100 Located in Coverage

Next, an operation of the UE 100 located in coverage will be described using FIG. 15.

Figure 15:
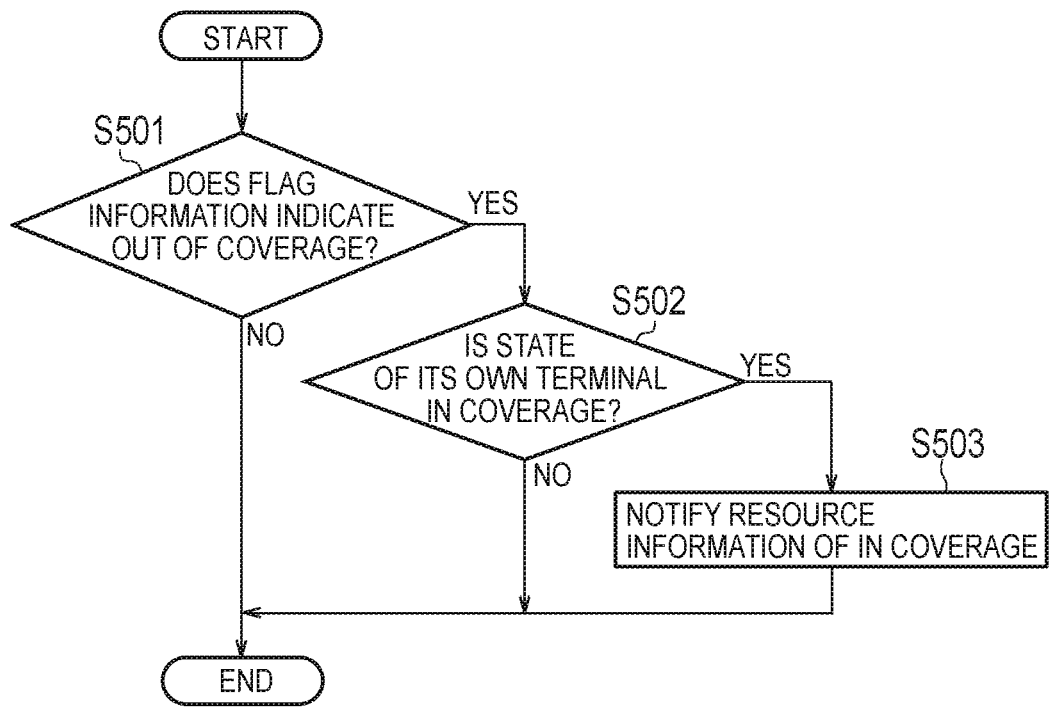
FIG. 15 is a flowchart for describing an operation of the UE 100 located in coverage.

As shown in FIG. 15, in step S501, the UE 100 scans the SA resource domain. Specifically, the UE 100 scans the SA resource domain limited in range on the basis of the SA resource information. The UE 100 uses an SA resource within the SA resource domain to receive the transmitted SA.

When receiving the flag information along with the received SA, the UE 100 determines whether or not the flag information indicates that another UE 100 which is the transmission source of the flag information is out of coverage. When the flag information indicates that the other UE 100 is out of coverage, the process of step S502 is executed. On the other hand, when the flag information indicates that the other UE 100 is not out of coverage, the UE 100 ends the process. It is noted that when the UE 100 receives a plurality of instances of flag information, the UE 100 ends the process only when each of the plurality of instances of the flag information indicates that the other UE 100 is not out of coverage. When any of the plurality of instances of the flag information indicates that the other UE 100 is out of coverage, the UE 100 executes the process of step S502.

In step S502, the UE 100 determines whether or not the UE 100 itself exists in a cell. The UE 100, for example, executes the processes of the above-described steps S402 to S404, and determines whether or not the UE 100 itself exists in the cell.

When the UE 100 itself exists in a cell, the UE 100 executes the process of step S503. When the UE 100 itself does not exist in a cell (that is, when located out of coverage), the UE 100 ends the process.

In step S503, the UE 100 transmits, to the other UE 100, the resource information (control resource information and/or data resource information) received from the cell in which the UE 100 exists. The UE 100 may notify the resource information by broadcast, or may transmit the resource information to the UE 100 located out of coverage by unicast. Furthermore, the UE 100 may use the SA resource to transmit the resource information, or may use the data resource to transmit the resource information. The UE 100 may transmit, together with the resource information, the flag information indicating that the UE 100 is not out of coverage.

In this way, the other UE 100 located out of coverage is capable of receiving the resource information. The other UE 100 that receives the resource information is capable of performing the operation described below.

(C) Operation of UE 100 Located out of Coverage

Next, an operation of the UE 100 (UE 100-2) located out of coverage will be described using FIG. 16.

A description will be provided on the assumption that when the UE 100-2 is located out of coverage, the UE 100-2 receives the resource information from the UE 100-1 existing in a cell.

Figure 16:
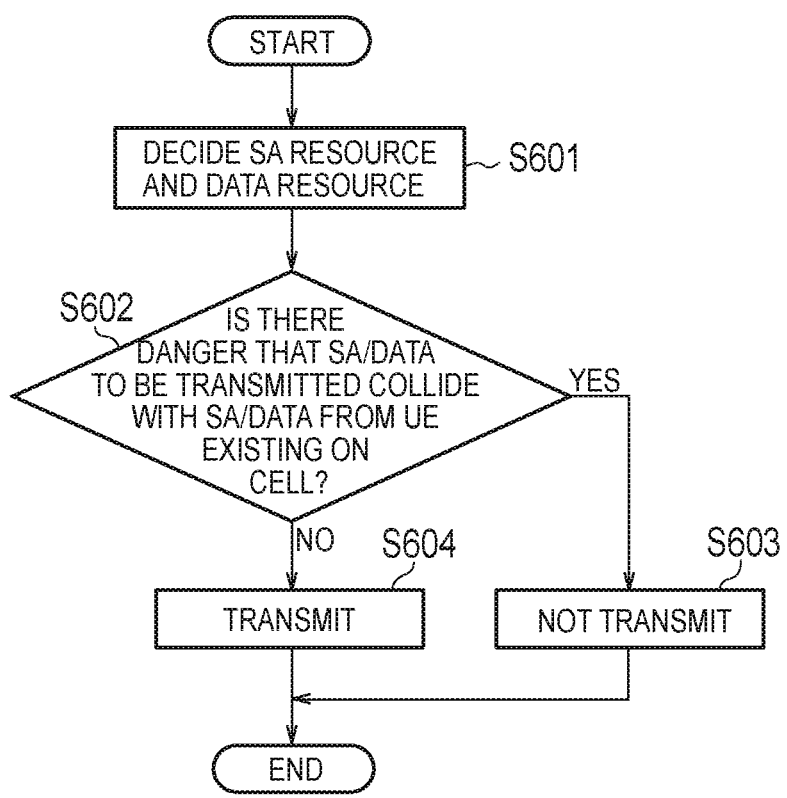
FIG. 16 is a flowchart for describing an operation of the UE 100 located out of coverage.

As shown in FIG. 16, in step S601, the UE 100-2 decides the SA resource and the data resource. The UE 100-2 decides the SA resource and the data resource by prioritizing the data resource information over the setting information.

It is noted that when the contents of the data resource information are more recent than the contents of the updated setting information, the UE 100-2 may decide the SA resource and the data resource on the basis of the setting information. The UE 100-2 may decide the SA resource and the data resource on the basis of the resource information received from the UE 100-1.

In step S602, when the UE 100-2 determines that there is a danger of a collision between SA transmitted by using the SA resource decided in step S601 and SA and/or D2D communication data transmitted by the UE 100 existing in a cell (in the case of "Yes"), the UE 100-2 executes the process of step S603, and when the UE 100-2 determines that there is no danger of the collision (in the case of "No"), the UE 100-2 executes the process of step S604.

Furthermore, when the UE 100-2 determines that there is a danger of a collision between the D2D communication data transmitted by using the data resource decided in step S601 and the SA and/or the D2D communication data transmitted by the UE 100 existing in a cell (in the case of "Yes"), the UE 100-2 executes the process of step S603, and when the UE 100-2 determines that there is no danger of the collision (in the case of "No"), the UE 100-2 executes the process of step S604.

For example, the UE 100-2 scans the SA resource within the resource domain limited in range on the basis of the resource information from the UE 100-1 existing in a cell. The UE 100-2 grasps the SA resource used for transmitting the SA, and infers the SA resource used for transmitting the SA on the basis of the resource information. Furthermore, the UE 100-2 grasps the data resource indicated by the received SA.

The UE 100-2 determines whether the inferred SA resource and the grasped data resource (resource of the UE 100 located in coverage) do not overlap the SA resource and the data resource used by the UE 100-2 to perform transmission (resource of the UE 100-2 itself). When the UE 100-2 determines that the resource of the UE located in coverage overlaps the resource of the UE 100-2 itself, the UE 100-2 determines that there is a danger of a collision, and when the UE 100-2 determines that the resource of the UE located in coverage do not overlap the resource of the UE 100-2 itself, the UE 100-2 determines that there is no danger of a collision.

Furthermore, for example, when the contents limiting the range of the SA resource domain and the data resource domain are matched between the setting information and the resource information, the UE 100-2 may determine that there is no danger of a collision. Alternatively, when the SA resource and the data resource of the UE 100-2 are within the range of the SA resource and/or the data resource of the UE 100 located in coverage, the UE 100-2 may determine that there is a danger of collision.

In step S603, the UE 100-2 does not transmit SA and D2D communication data by using the decided SA resource and the data resource. The UE 100-2 may newly decide the SA resource and the data resource on the basis of the resource information.

In step S604, the UE 100-2 transmits SA by using the decided SA resource, and transmits D2D communication data by using the decided data resource.

As a result of such an operation of the UE 100-2, when D2D communication is performed around a cell edge, it is possible to reduce a collision between the SA and/or the D2D communication data of the UE 100-2 located out of coverage and the SA and/or the D2D communication data of the UE 100 existing in a cell.

Summary of Embodiment

In the present embodiment, the UE 100 decides a data resource and an SA resource from among time-frequency resources available for the D2D proximity service. The UE 100 decides the data resource from a data resource domain limited in range in the time-frequency resources available for the D2D proximity service. In this way, the UE 100, for example, is capable of avoiding selection of a data resource domain from an area different from the data resource domain (for example, SA resource domains), thereby appropriately deciding the data resource.

In the present embodiment, the eNB 200 transmits data resource information to the UE 100. In this way, when the UE 100 exists in a cell managed by the eNB 200, the UE 100 takes an initiative in deciding the SA resource and a data resource; however, the eNB 200 may control the decision of an SA resource and a data resource. Furthermore, in both cases where the UE 100 exists in a cell and where the UE 100 is located out of coverage, an SA resource and a data resource domain are decided by the initiative of the UE 100, and thus, there is a merit that the operation of the UE 100 is not complicated.

In the present embodiment, the eNB 200 transmits, together with SA resource information, data resource information to the UE 100 by unicast. In this way, on the basis of both the SA resource information and the data resource information, the UE 100 is capable of appropriately deciding the SA resource and the data resource.

In the present embodiment, the UE 100 transmits the data resource information by broadcast. The data resource information is information for limiting at least one of the location of a data resource and the size of a data resource. In this way, the eNB 200 is capable of appropriately controlling the decision by the UE 100 existing in a cell about an SA resource and a data resource.

In the present embodiment, when the UE 100 exists in a cell managed by the eNB 200, the UE 100 transmits data resource information received from the eNB 200. In this way, a UE 100 located out of coverage is capable of deciding the SA resource and the data resource on the basis of the data resource information received from the UE 100 existing in a cell.

In the present embodiment, when the UE 100 receives, from another UE 100, flag information indicating that the other UE 100 is located out of coverage, the UE 100 transmits the data resource information to the other UE 100. In this way, since the UE 100 confirms that the other UE 100 is located out of coverage and then transmits the data resource information, it is possible to suppress unnecessary transmission of the data resource information.

In the present embodiment, when the UE 100 located out of coverage receives the data resource information from the UE 100, the UE 100 located out of coverage prioritizes the data resource information over the setting information to decide the data resource. In this way, when D2D communication is performed around a cell edge, it is possible to reduce a collision between SA and/or D2D communication data of the UE 100 located out of coverage and SA and/or D2D communication data of the UE 100 existing in a cell.

In the present embodiment, the UE 100 decides the data resource on the basis of the location of an SA resource and/or the size of an SA resource. In this way, the eNB 200 is capable of controlling the decision of a data resource by the SA resource information without transmitting the data resource information.

In the present embodiment, the SA resource domain is provided periodically in a time axis direction. Depending on the location of the SA resource in a previous period, the range of an SA resource domain in a next period is limited. Moreover, depending on the location of the SA resource, the range of the data resource domain is limited. The UE 100 decides the data resource depending on the location of the SA resource in a previous period. In this way, since the range of the data resource domain is limited depending on the location of the SA resource, when SA resources respectively used by the UE 100 and another UE 100 do not overlap each other, it is possible to avoid a collision of the respective data resources of the UE 100 and the other UE 100. Moreover, since the range of the SA resource domain in a next period is limited depending on the location of the SA resource in a previous period, it is possible to avoid the use of the SA resource in a next period corresponding to the location of the SA resource that is being used in a previous period. Therefore, it is possible to avoid collisions of the respective SAs of the UE 100 and the other UE 100.

In the present embodiment, the UE 100 is capable of using an SA resource to transmit, together with SAs, flag information indicating whether or not the UE 100 is located out of coverage. In this way, another UE 100 is capable of scanning an SA resource domain, thereby grasping whether or not a UE 100 located out of coverage exists around the other UE 100.

Other Embodiments

As mentioned above, the present invention has been described with the embodiment. However, it should not be understood that those descriptions and drawings constituting a part of the present disclosure limit the present invention. From this disclosure, a variety of alternate embodiments, examples, and applicable techniques will become apparent to one skilled in the art.

For example, in the above-described embodiment, when the UE 100 is located at the edge of a cell, the UE 100 may transmit, to another UE 100, resource information received from the cell in which the UE 100 exists. For example, when a reception level of a radio signal from the eNB 200 is within a predetermined range, the UE 100 determines that the UE 100 is located at the edge of a cell. Alternatively, the UE 100 may determine whether the UE 100 is located at the edge of a cell by GNSS information.

Furthermore, in the above-described embodiment, the UE 100 may repeatedly transmit the same D2D communication data at a bit level by using the decided data resource. Specifically, when the decided data resource is configured by a plurality of data channel elements, the UE 100 transmits the same D2D communication data through each of the plurality of data channel elements.

It is noted that the UE 100 may reduce a bit number of data with a high priority (for example, emergency data), and repeatedly transmit the data with a high priority in one data resource (resource block). For example, in the case of utilizing VoIP as an application used in D2D communication, the UE 100 may repeatedly transmit voice data with an increased compression rate in one resource block.

Figure 17:
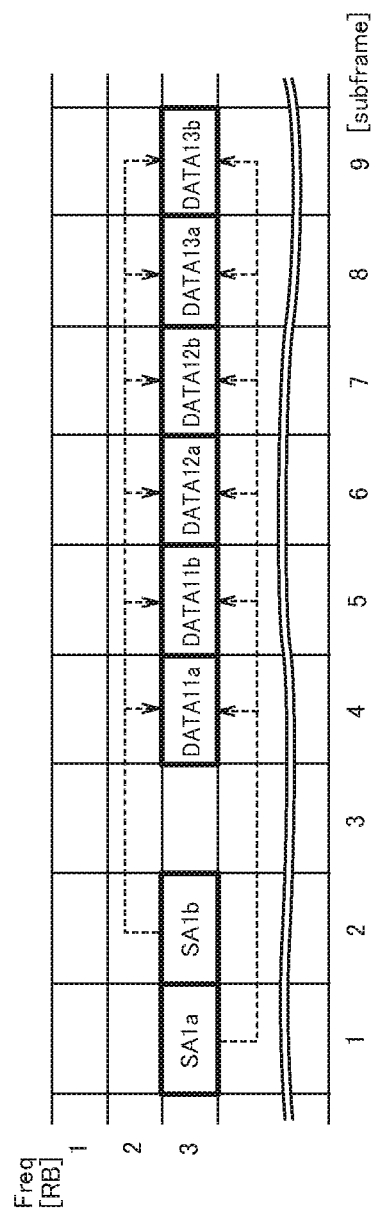
FIG. 17 is a configuration diagram of a radio frame in the mobile communication system according to another embodiment.

Furthermore, in the above-described embodiment, the UE 100 may repeatedly transmit the same D2D communication data in units of resource blocks by using the decided data resource. Specifically, a description will be provided with reference to FIG. 17. FIG. 17 is a configuration diagram of a radio frame in the mobile communication system according to another embodiment.

In FIG. 17, SA1*a* and SA1*b* have the same information and indicate the locations of the same data resources. Each of SA1*a* and SA1*b* indicates the locations of data resources of DATA 11*a* to DATA 13*b*. DATA 11*a* and DATA 11*b* are the same D2D communication data, DATA 12*a* and DATA 12*b* are the same D2D communication data, and DATA 13*a* and DATA 13*b* are the same D2D communication data.

It is noted that, in FIG. 17, the UE 100 repeatedly transmits the same D2D communication data in units of resource blocks in a time axis direction; however, the present invention is not limited thereto. The UE 100 may repeatedly transmit the same D2D communication data in units of resource blocks in a frequency axis direction.

Furthermore, in the above-described embodiment, in the case of transmitting SA resource information for (directly) specifying an SA resource, the eNB 200 is capable of transmitting the SA resource information by using DCI. On the other hand, in the case of transmitting SA resource information for (directly) specifying the range of an SA resource (that is, SA resource domain), the eNB 200 is capable of transmitting the SA resource information by using an RRC message (for example, an SIB).

Furthermore, in the above-described embodiment, an example has been described in which the present invention is applied to the LTE system. However, the present invention is not limited to the LTE system, and may also be applied to systems other than the LTE system.

[Contribution]
(1) Introduction

Resource allocation method with scheduling assignment (SA) for D2D communication is proposed. In this contribution, D2D communication resource allocation with SA is considered from collision avoidance perspective. In this contribution the allocation for out of coverage is focused on. The similar scheme can be used for in-coverage case as well. However, in-coverage case is not discussed in this contribution.

(2) Design Considerations for D2D Communication Resource Allocation using Scheduling Assignments SA assisted resource allocation provides a possibility of efficient collision avoidance. SA has several advantages.

Figure 18:
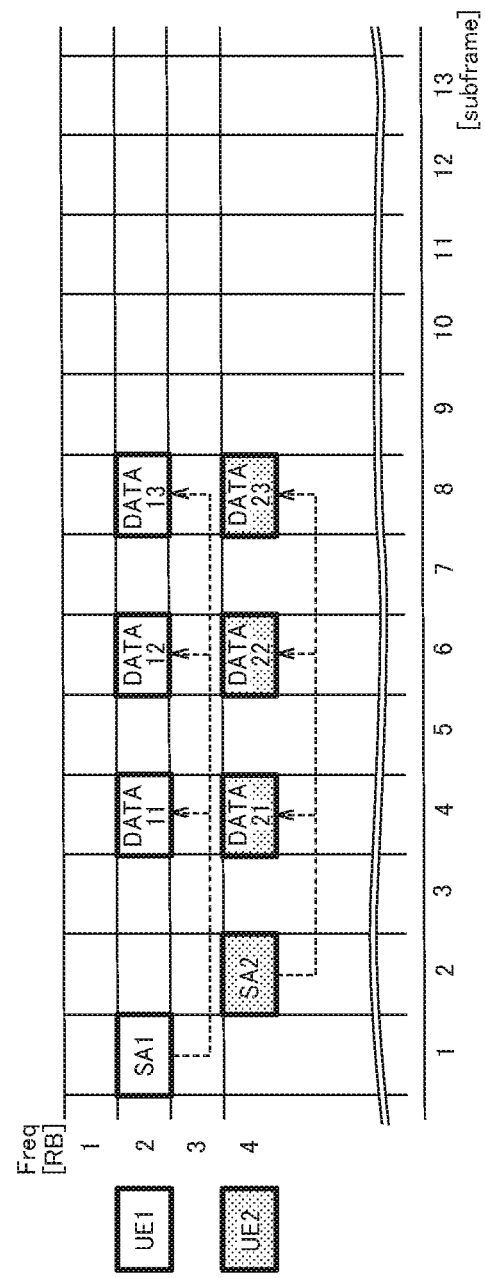
FIG. 18 is a diagram showing a usage example of SA for avoiding a data collision.

FIG. 18 shows a method by which a UE 2 detects SA 1 transmitted by a UE 1, and schedules data transmission of the UE 2 by using the detected information to avoid resources listed in SA 1. Moreover, in order to improve the above-mentioned resource allocation, an additional operation related to SA based on a resource allocation scheme will be proposed.

Figure 19:
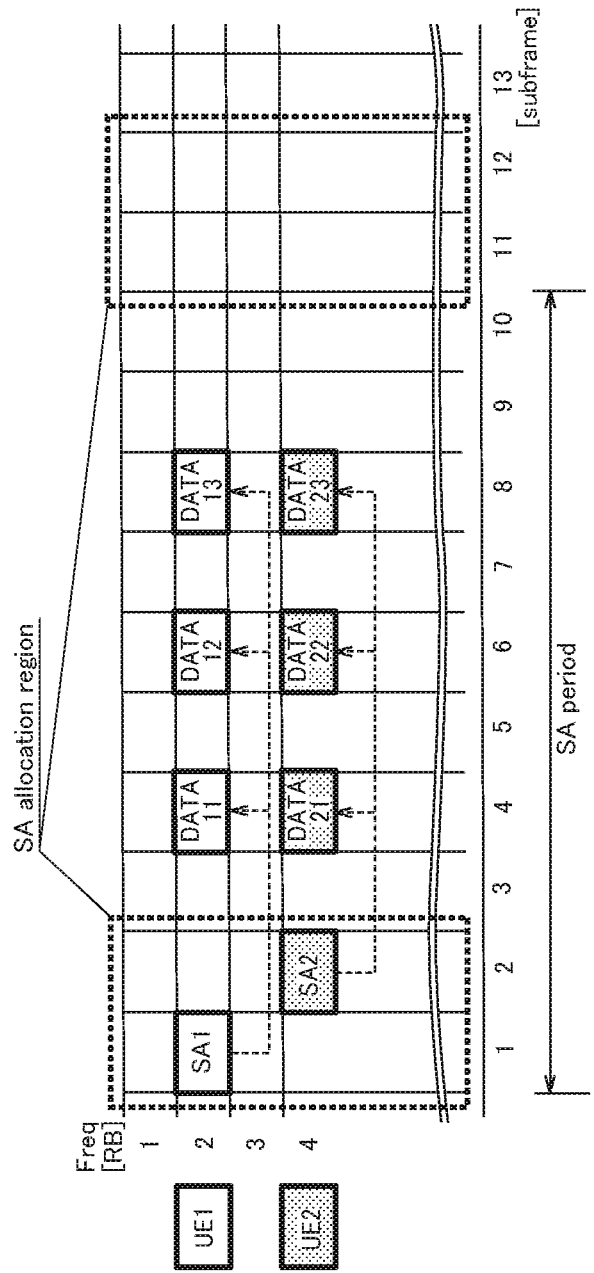
FIG. 19 is a diagram for describing an SA period and an SA area.

(3) Design Considerations for D2D Communication Resource Allocation Rules for Out of Coverage (3.1) SA Transmissions In order to reduce receiver complexity SA transmissions are periodic and using pre-defined time-frequency resources known to the receiver. As an example, shown in the FIG. 19, the location for SA transmission resources can be grouped together within a region for simpler detection.

Proposal 1: If SA is agreed then SAs should be transmitted periodically and grouped together within a given region.

(3.2) Transmission of Data

Figure 20:
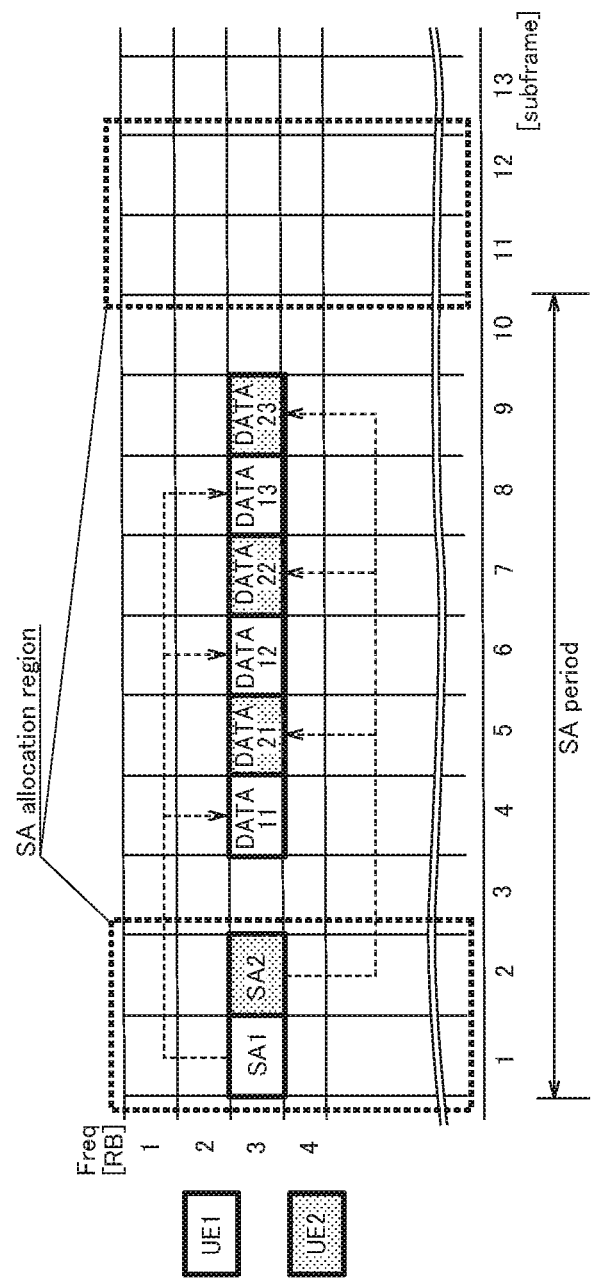
FIG. 20 is a diagram for describing that each SA decides location related to data transmission resources.

In this section a method is described to avoid data collisions. Each SA is mapped to a certain set of time-frequency resources that can be used for data transmissions. Each D2D is allowed to select a resource for its SA transmission as described in the above section. However, the same D2D UE can only transmit its data in resources that are associated with the SA resource location. In other words, the location of the SA determines the location of the data transmission resources. As shown in the FIG. 20, SA1 and SA2 points to data 11, 12, 13 and data 21, 22, 23 respectively. This method avoids collisions between data transmissions.

Proposal 2: In order to avoid data collisions SA is mapped to a certain set of time-frequency resources that can be used for data transmissions.

(3.3) Reduction in Collision of SA Transmissions

Figure 21:
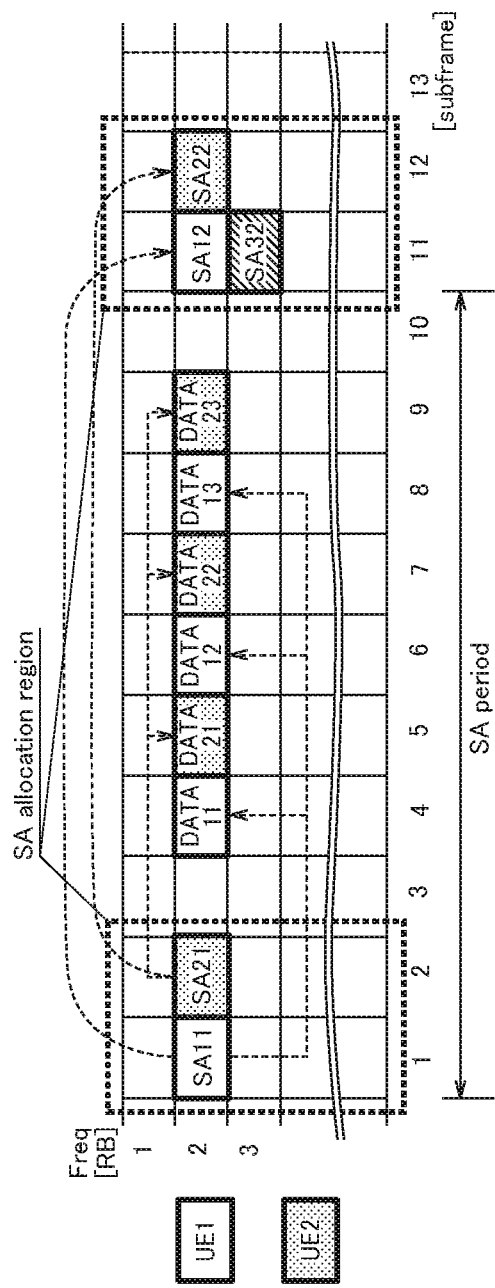
FIG. 21 is a diagram for describing an initial SA transmission and a subsequent SA transmission.

The above method describes the allocation of data transmissions using SA as a pointer. However, the above method is not sufficient to avoid collisions between SA transmissions. In this section, a method to reduce SA transmission collisions is presented. Each D2D UE monitors the SA region to detect SA transmitted by the other D2D UEs. Using this information, the same D2D UE avoids transmitting its SA in the same resource used by other D2D UEs during the previous SA transmissions. For example, as shown in FIG. 21, UE1 and UE2 transmit SA11 and SA21 respectively. A third D2D UE (not shown in the figure) detects those transmissions and then transmits its SA32 at a different location. UE1 and UE2 can use the same resources used in the previous iteration for SA12 and SA22, respectively. In the initial first SA period UE1 and UE2 can randomly select resources for SA transmissions.

Proposal 3: If SA is agreed then to reduce SA collisions, D2D UE avoids transmitting its SA in the same resource used by the other D2D UEs in the previous SA transmissions.

Proposal 4: If SA is agreed, then the resources for the initial SA transmissions are randomly selected in the SA region.

INDUSTRIAL APPLICABILITY

As described above, a mobile communication system and a user terminal according to the present embodiment are useful in the mobile communication field.

The invention claimed is:

1. A method for performing D2D (Device-to-Device) communication comprising:

broadcasting, from a base station, system information block message, the system information block message including first control information indicating a first frequency band;

receiving, by a first user terminal being in coverage of the base station, the first control information from the base station;

performing, by the first user terminal, D2D communication on the basis of the received first control information;

broadcasting, from the first user terminal, the first control information indicating the first frequency band to be used for the D2D communication, and second control information, using a first time radio resource, in response to:

receiving, by the first user terminal, the first control information from the base station; and a reception level of a signal received by the first user terminal from the base station satisfying a predetermined condition, wherein the second control information indicates that the first user terminal is in the coverage;

receiving, by a second user terminal being out of coverage of the base station, the first control information and the second control information from the first user terminal, selecting, by the second user terminal, a second time radio resource different from the first time radio resource, for transmitting, by the second user terminal, third control information and fourth control information; and transmitting, by the second user terminal, using the second time radio resource, the third control information and the fourth control information, wherein the third control information is determined by the second user terminal based on the first control information, the second user terminal transmits the third control information and the fourth control information in response to receiving, by the second user terminal, the first control information and the second control information from the first user terminal, the third control information indicates a second frequency band to be used for the D2D communication, and the fourth control information indicates that the second user terminal is out of the coverage; and performing, by the second user terminal, D2D communication on the basis of the first control information and the second control information received from the first user terminal.

2. A user terminal supporting D2D (Device-to-Device) communication, comprising:

a processor and a memory coupled to the processor, the processor configured to:

receive, when the user terminal is in coverage of a base station, first control information from the base station;

perform D2D communication on the basis of the received first control information;

broadcast the first control information indicating a frequency band to be used for the D2D communication, along with second control information indicating that the user terminal is in the coverage, using a first time radio resource, in response to:

receiving, by the user terminal, the first control information from the base station; and a reception level of a signal received by the user terminal from the base station satisfying a predetermined condition, wherein the first control information and the second control information transmitted by the user terminal are received by another user terminal being out of coverage of the base station, the another user terminal performs D2D communication on the basis of the first control information and the second control information received from the user terminal, and the another user terminal selects a second time radio resource different from the first time radio resource used by the user terminal, and transmits third control information and fourth control information using the second time radio resource, wherein the another user terminal transmits the third control information and the fourth control information in response to receiving the first control information and the second control information from the user terminal, the third control information is determined by the another user terminal based on the first control information, the third control information indicates a second frequency band to be used for the D2D communication, and the fourth control information indicates that the another user terminal is out of the coverage.

3. A user terminal supporting D2D (Device-to-Device) communication, comprising:

a processor and a memory coupled to the processor, the processor configured to:

receive fourth control information and second control information from another user terminal when the user terminal is out of coverage, the fourth control information and the second control information being transmitted by the another user terminal using a first time radio resource;

select a second time radio resource different from the first time radio resource, for transmitting, by the user terminal, first control information determined based on the second control information, and third control information; and transmit, using the second time radio resource, the first control information and the third control information, in response to:

receiving, by the user terminal, the fourth control information and the second control information from the another user terminal, wherein the first control information indicates a first frequency band to be used for the D2D communication, the second control information indicates a second frequency band to be used for the D2D communication, the third control information indicates that the user terminal is out of the coverage, and the fourth control information indicates that the another user terminal is in the coverage, and perform D2D communication on the basis of the fourth control information and the second control information received from the another user terminal.

* * * * *